Figure 8:
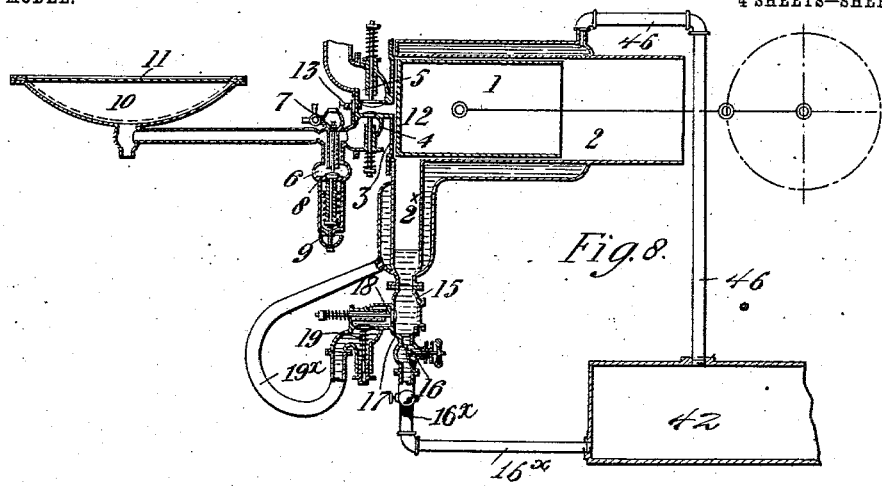

No. 752,273. PATENTED FEB. 16, 1904.
A. VOGT.
INTERNAL COMBUSTION MOTOR.
APPLICATION FILED JAN. 9, 1902.
NO MODEL. 4 SHEETS—SHEET 1.
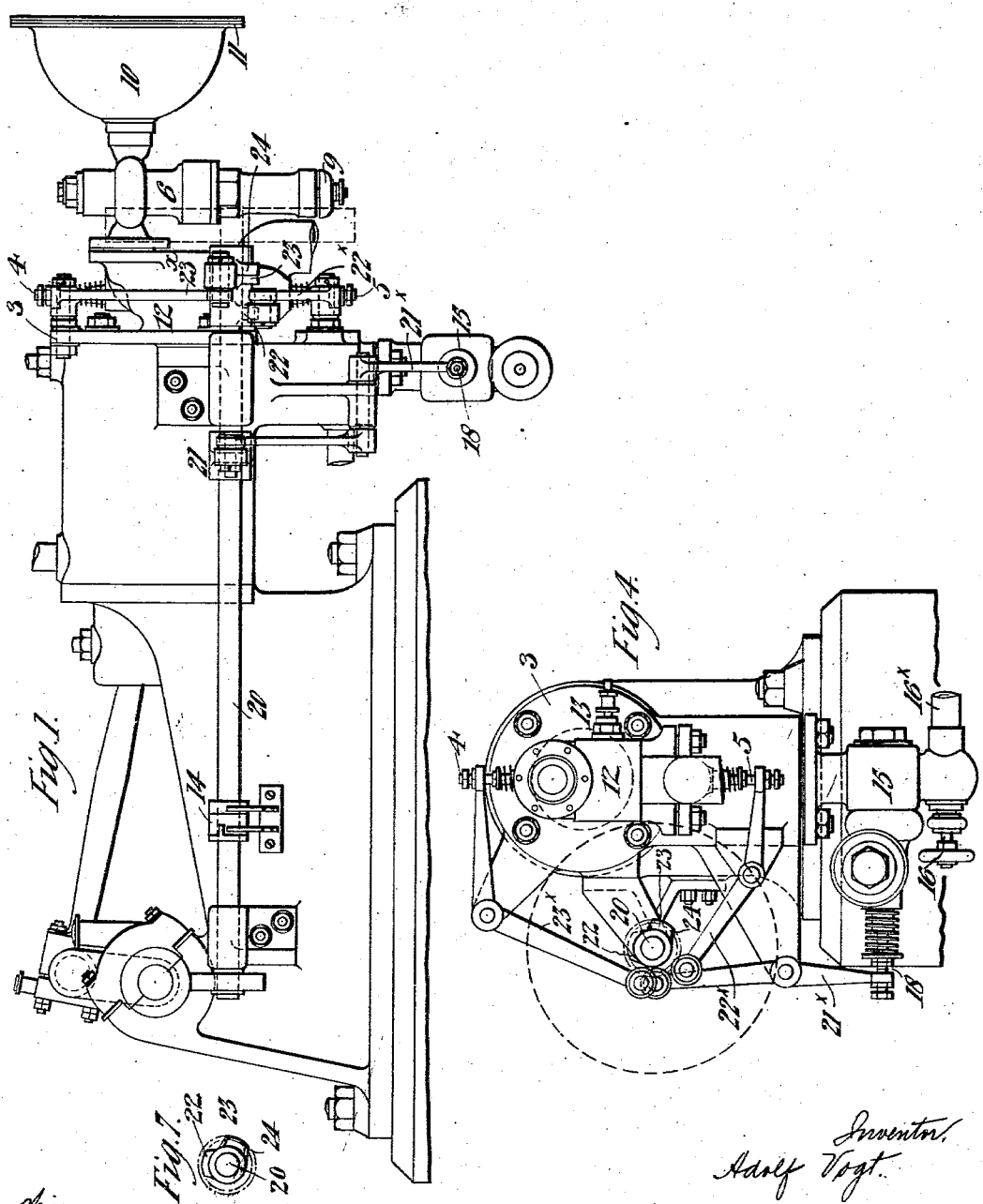

No. 752,273. PATENTED FEB. 16, 1904.
A. VOGT.
INTERNAL COMBUSTION MOTOR.
APPLICATION FILED JAN. 9, 1902.
NO MODEL. 4 SHEETS—SHEET 2.
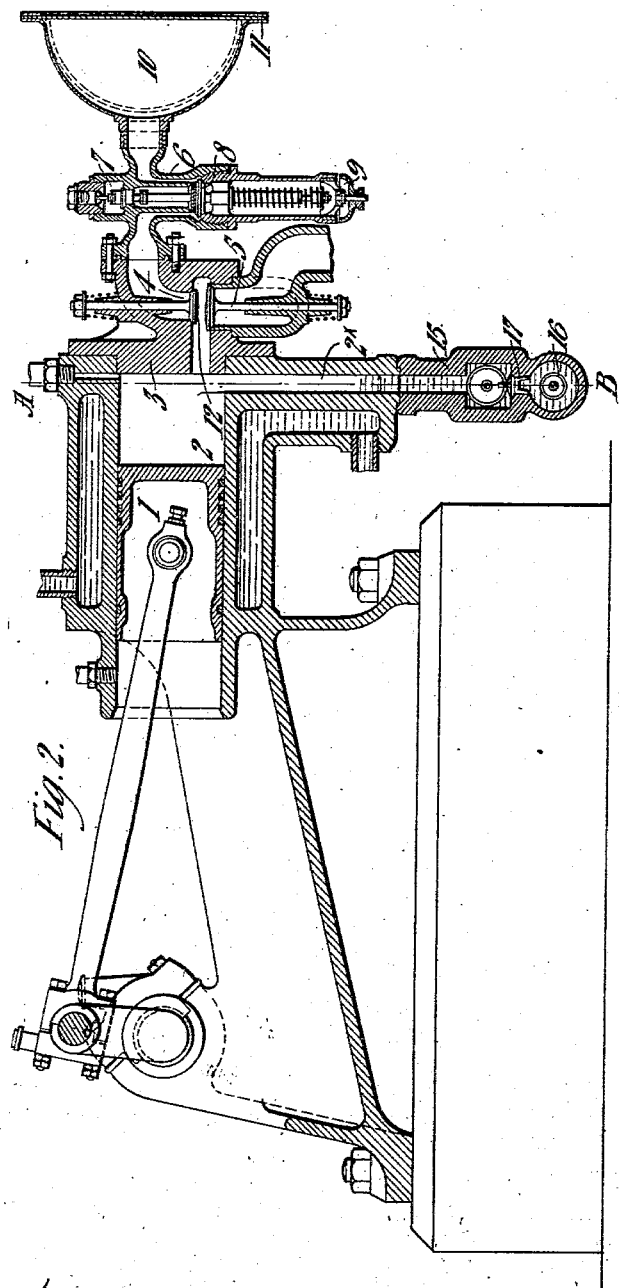
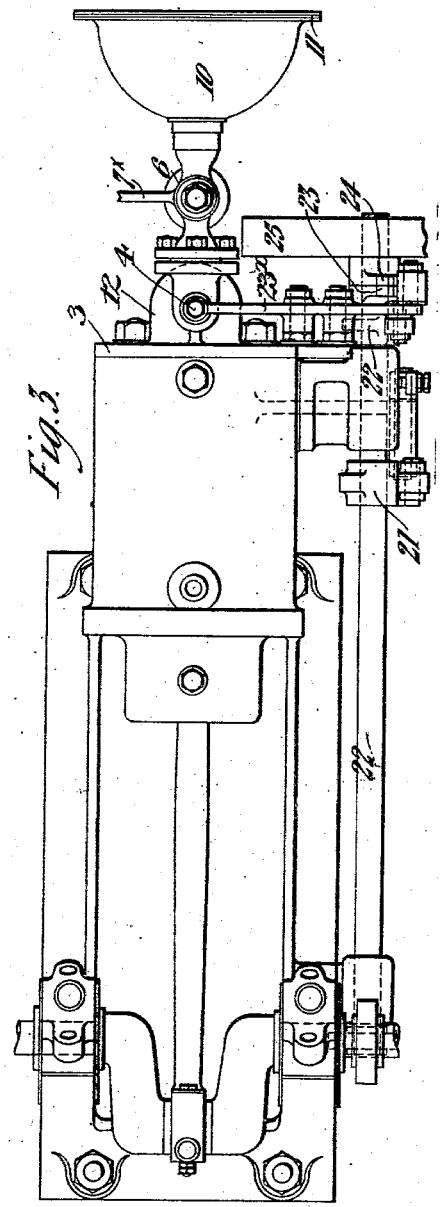

No. 752,273. PATENTED FEB. 16, 1904.
A. VOGT.
INTERNAL COMBUSTION MOTOR.
APPLICATION FILED JAN. 9, 1902.
NO MODEL. 4 SHEETS—SHEET 3.
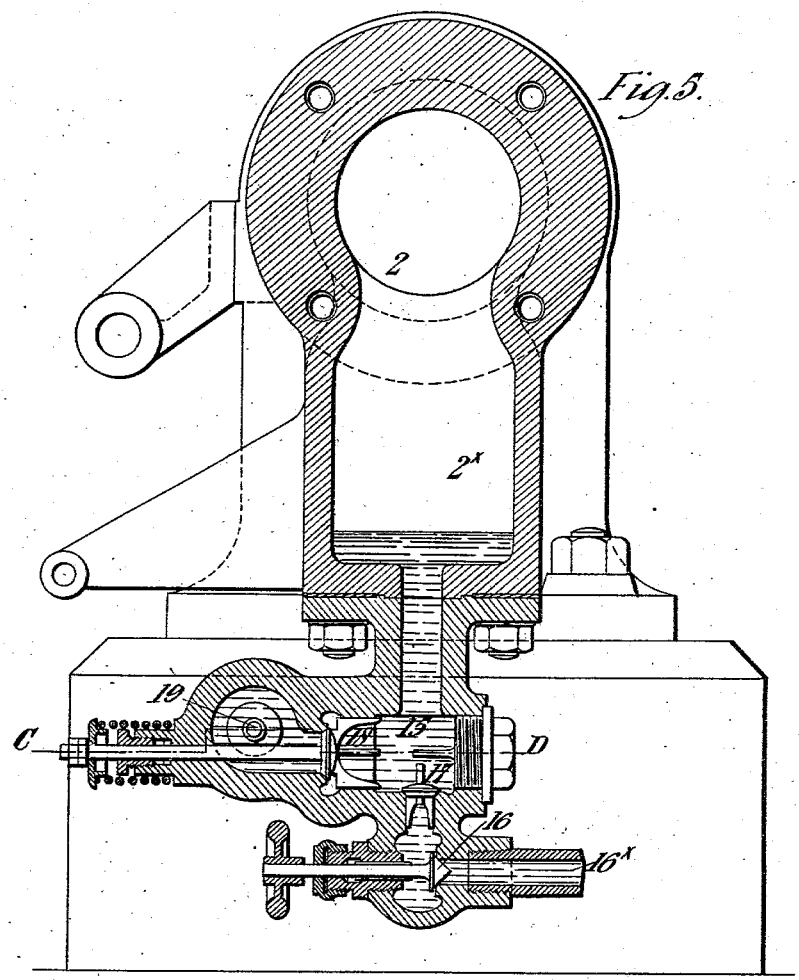
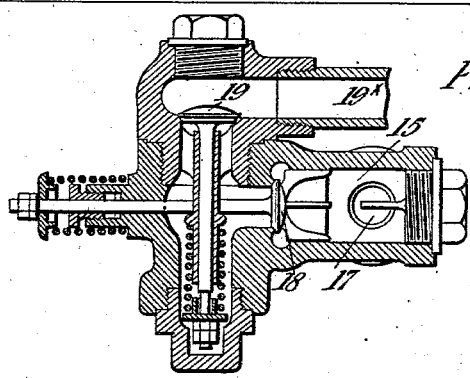

No. 752,273. PATENTED FEB. 16, 1904.
A. VOGT.
INTERNAL COMBUSTION MOTOR.
APPLICATION FILED JAN. 9, 1902.
NO MODEL. 4 SHEETS—SHEET 4.

Witnesses:
Inventor
Adolf Vogt
by
Atty

No. 752,273. Patented February 16, 1904.

UNITED STATES PATENT OFFICE.

ADOLF VOGT, OF WEST NORWOOD, ENGLAND.

INTERNAL-COMBUSTION MOTOR.

SPECIFICATION forming part of Letters Patent No. 752,273, dated February 16, 1904.

Application filed January 9, 1902. Serial No. 89,072. (No model.)

*To all whom it may concern:*

Be it known that I, ADOLF VOGT, a citizen of Austria-Hungary, residing at 91 Thornlaw road, West Norwood, in the county of Surrey, England, have invented certain new and useful Improvements in Internal-Combustion Motors, (for which I have applied for a patent in Great Britain, dated June 14, 1901, No. 12,203,) of which the following is a specification.

The efficiency of internal-combustion motors (as regards the utilization of heat) is very low for the following reasons: The compression cannot be forced sufficiently high owing to the risk of premature ignition. The volume to which the gases of combustion expand only equals the volume of the gases before compression. The fresh combustible mixture mixes with the products of combustion within the compressing-chamber, (which is very large in order to prevent too early ignition, twenty to thirty per cent. of the stroke volume,) thereby interfering with the rapidity of combustion. The regulation for various loads is obtained either by stopping the supply of the combustible mixture or by making it poorer. Both methods affect the efficiency and the regularity of working. The gas consumption for an unloaded engine amounts up to forty per cent. of that for the full load, so that the mean efficiency of an engine which (according to the load) works on the average with thirty to sixty per cent. of full load is very small. By working as hereinafter explained the mean efficiency can be made three or four times that of engines used at present and the efficiency at full load can almost be doubled.

A four-cycle motor according to my invention operates as follows: The piston in its instroke approaches close to the cylinder-bottom. At this end of the cylinder a chamber extends downward which serves as a compression-chamber. This chamber is connected with a tank containing liquid by a pipe provided with a check-valve which opens toward the cylinder. A second pipe with a cock or valve acted on by the valve-shaft leads from the compression-chamber to the liquid-tank, another valve loaded so as only to open under a certain pressure being interposed between the last-named cock or valve and the tank. The exhaust-valve is arranged and worked as usual and can be held open during the exhaust-stroke by means of a cam. The suction-valve connects the cylinder with a chamber into which during the suction-stroke air and gas enter, as may be required, the mixture never requiring any alteration in its composition. The air and combustible fluid can be introduced separately into this chamber and mixed within it. The suction-valve is opened either automatically or by the action of the valve-shaft and influenced from the governor in such manner that at full load it is closed after completion of the suction-stroke. At less load, however, it is kept open for some time, so that part of the introduced mixture flows back into the mixing-chamber during the compression-stroke. The mixing-chamber is made with a flexible diaphragm or otherwise arranged so that it can expand. The compression only commences when just as much mixture is left in the cylinder as is required for the work to be done. During the next working stroke the amount of mixture introduced by suction into the mixing-chamber is less by so much as was returned into it during the compression-stroke. By its to-and-fro motion the mixture is thoroughly mixed and at low loads the expansion-stroke is considerably larger than the compression-stroke, so that it becomes possible to expand down to atmospheric pressure and so to obtain a correspondingly higher heat value. (With the present motors at the end of the expansion-stroke the pressure in the cylinder is still at several atmospheres, which pressure is absolutely utilized in an engine according to the present invention.) During the suction-stroke a quantity of liquid is introduced into the compression-chamber by suction through the check-valve. The cock or valve in the pipe which connects the compression-chamber with the loaded valve which opens outward is closed by the action of the engine shortly before completion of the compression and remains closed during the explosion-stroke. The valve which opens outward is so loaded that it opens when the desired pressure of compression is exceeded. As every suction-stroke introduces a quantity of liquid into the compression-chamber, its space above the liquid becomes smaller with every suction-stroke. It consequently becomes too small if the load remains constant. The pressure of compression will pass its admissible maximum. Consequently the valve which opens outward is opened, so that part of the liquid in the compression-chamber is forced out of it. The compression-chamber consequently automatically adapts itself to the load. Whether the motor works with full charge or a fraction thereof the pressure of compression always remains the same. In the case of extremely large variations of load a few revolutions are sufficient, whether the load increases or decreases, to render the pressure normal. The valve opening outward and the starting-off device between it and the chamber must have such dimensions that a quantity of liquid can be expelled at a single compression-stroke without excessively raising the pressure of the compression, the said quantity corresponding to the difference of volume of the compression-chamber between no load and full load. To raise the efficiency in general, considerably greater compression is used. To prevent the danger of too early ignition, a spray or mist of water is blown into the introduced mixture during suction or drawn in by the suction. As this water-spray is vaporized during the compression, the compression becomes almost isothermic—that is to say, no such rise of temperature takes place during compression as would cause premature ignition. As the sucking action corresponds to the load, the quantity of water introduced as spray regulates itself quite automatically. The water-spray and the liquid which alters the capacity of the compression-chamber can both be introduced by means of pumps, the stroke volume or volumetric efficiency of which can be influenced by the governor. The liquid for altering the capacity of the compression-chamber can either be oil of high ignition point or other suitable liquid. The liquid need not come in contact with the explosion-mixture, as they may be separated by a plunger-piston which is freely moved by the liquid. As the compressing work as well as the sucking action is proportional to the load, the mechanical efficiency must even at low load be very great. Consequently the engine will work with almost constant efficiency from one-third to three-fourths load. The nominal efficiency of the engine is to be that at which the expansion can be brought nearly to atmospheric pressure. Such an engine will work with seven-twelfths filling, and the output in respect to the stroke volume will nevertheless be larger than with the engines at present in use. Therefore the engine can be lighter than the present for the same output. With full charge the engine will work with thirty to one hundred and fifty per cent. more power; but full effect of the heat is not obtained, because the expansion cannot proceed to atmospheric pressure. This method of operating can also be applied to double-acting engines and in which each end of the cylinder has a four cycle. The valve which opens outward is common to both, and so is the mixing-chamber. By this arrangement an even working of both cylinder ends is insured. If this method of operating is to be adapted for single-acting two-cycle engines, it can be done in the following manner:

(a) An engine with a long piston which at the end of its outstroke uncovers exhaust-slots and the front side of which acts as an air and gas or mixture pump. The introduction of compression cooling-water and propelling of the liquid for altering the volume of the compression-chamber are obtained through suction or pressure action of the front end of the cylinder or by special pumps. A part of the introduced mixture can return to the suction chambers or chamber by holding open the suction-valve, or it may enter an expansible mixing-chamber between the front and backs ends of the cylinder. By the expansion of this chamber or by the governor the transferred mixture is altered to correspond to the load—for instance, by alteration of the volumetric efficiency in such manner that either the suction-conduit is correspondingly closed and the suction-valve is held open during part of the pressure-stroke or that part of the mixture in the mixing-chamber is permitted to flow back during suction.

(b) An engine with short piston and separate exhaust-valve can work in the same way.

(c) In the case of engines in which first air and then the mixture or only gas is admitted surplus mixture is returned only to the mixture or gas chamber, which can be expansible, while the air-pump remains unaffected.

In the case of double-acting two-cycle engines—that is, one-stroke action working like a steam-engine—separate pumps have to be used for the mixture, or for the air and the combustible substance pumps which have to be adapted, as previously explained, in their efficiency to the load. They can have one mutual mixing-chamber and also one mutal valve opening outward which has to regulate the compression-pressure. The connection between the individual cylinder ends and this valve can be effected by means of separate shutting-off devices or one mutual one, such as a four-way cock, which always connects the one cylinder end with this valve while shutting off the other end. The forcing of the liquid for variation of the compression-chamber, as well as of the water-spray for compression-cooling, can be effected by means of the suction and pressure action of the pumps for the air mixture or combustion material or by other special pumps. According to the working method of the engine the governor either holds open the valve for admission of the mixture during part of the compression-stroke or the exhaust-valve during the same time, causing the admission of combustion material only after closure of the exhaust-valve in quantity corresponding to the charge. With all these motors care has to be exercised that in case of low load the expansion be not carried too far. To open the exhaust-valve or any other valve provided for this purpose, the sucking action can be utilized, which takes place when the working gases have been expanded far below atmospheric pressure.

Figure 9:
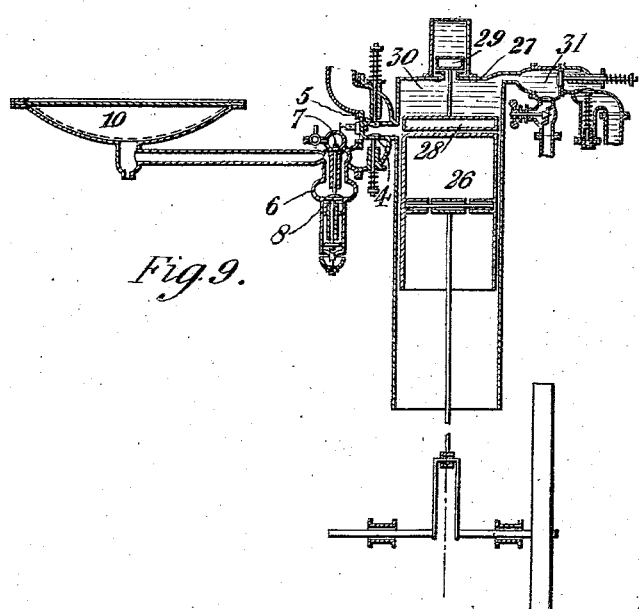

Figure 1 of the accompanying drawings shows a side elevation of a motor constructed according to my invention. Fig. 2 shows a vertical longitudinal section. Fig. 3 shows a plan. Fig. 4 shows a back end view to an enlarged scale, the regulating device 10 being removed. Fig. 5 shows a cross-section on line A B, Fig. 2; and Fig. 6 shows a section on line C D, Fig. 5. Fig. 7 shows a side view of the variable cam device for the supply-valve. Fig. 8 shows a diagrammatic section of the motor. Fig. 9 shows a diagrammatic section of a modified form of motor.

On the accompanying drawings are shown, by way of example, several arrangements of motors constructed and operating according to my above-described invention.

In the arrangement shown at Figs. 1 to 7, which represents a four-stroke cycle-motor, the piston 1 of the motor-cylinder 2 is connected in the usual manner to the crank-shaft and works at the end of instroke close up to the cylinder-cover 3. The cylinder has its inner end formed with a sack-like chamber $2^x$, the capacity of which is somewhat larger than is required for the maximum compression-space. On the back of the cylinder-cover 3 is a valve-chamber 12, containing, first, the inlet-valve for combustible mixture 4, and, secondly, the discharge-valve 5 for the combustion-gases. To the chamber of the admission-valve 4 is fixed the mixing-valve chamber 6, containing the gas-inlet valve 7 and the air-inlet valve 8, these valves being connected together by their stems, so as to open and close simultaneously. The supply of air to the air-valve chamber can be regulated by an adjustable cap 9, and the gas-supply pipe connected to the chamber 6 above the gas-valve is provided with a suitable regulating-cock with index and scale for adjusting the gas-supply in the event of the gas-pressure being subject to fluctuation.

To a branch on the casing 6 is fixed a regulating-chamber 10, which communicates with the valve-chamber 12 and motor-cylinder, the outer end thereof being closed by a flexible diaphragm 11, so as to afford it a variable capacity.

Between the valves 4 and 5 there is provided in the valve-chamber 12 the igniting device, which is here intended to be any suitable electric igniter, (indicated at 13, Fig. 4,) and which is actuated by a commutator 14, Fig. 1, on the cam-shaft 20. To the lower end of cylinder-chamber $2^x$ is fixed another valve-chamber 15, in which are situated, first, a regulating-valve 16 for controlling the admission of liquid through pipe $16^x$, which is also provided with a shut-off cock and which communicates with a reservoir of liquid under a head of pressure; secondly, a valve 17 for the admission of liquid from $16^x$ into the chamber $2^x$; thirdly, a mechanically-actuated valve 18 for controlling the communication of the valve-chamber 15 with an escape-pipe $19^x$ through a loaded valve 19, which is held closed with a certain regulatable pressure by a spring, as shown. The pipes $16^x$ and $19^x$ can both communicate with one and the same vessel containing, for example, cooling-water for the engine.

On the cam-shaft 20 are fixed the cams controlling the action of the engine—namely, the cam 21 for actuating the valve 18 through a lever $21^x$, a cam 22 for actuating the discharge-valve 5 through lever $22^x$, a cam 23 for actuating the admission-valve 4 through lever $23^x$, and a supplemental cam 24 operating in combination with cam 23 for keeping the admission-valve open for a longer time than usual, as will be presently described, this cam being connected to a centrifugal disk regulator 25 of well-known construction carried on the end of shaft 20 and actuating cam 24, so as to increase or decrease the duration of the action of cam 23 on valve 4 by shifting it more or less round relatively to cam 23, as indicated at Fig. 7.

The action of the above-described motor is as follows: The valve 19 has its spring so adjusted that it will only open when subject to a certain pressure—such, for example, as six atmospheres. For starting the motor valve 16 is opened and also the cock on pipe $16^x$, so as to admit liquid into 15 and $2^x$. After a few revolutions of the motor-shaft the valve-casing 15 and part of chamber $2^x$ will have become filled with liquid, entering through the valve 17 during the suction-strokes of piston 1, whereby the compression-chamber $2^x$ of the cylinder will become reduced in capacity. Valve 18 is kept open during the compression-stroke by means of the cam 21, being allowed to close just before the piston reaches the dead-point. By thus keeping 18 open it will be seen that the pressure of the compressed charge in $2^x$ in acting through the liquid in 15 upon the valve 19 will force this open as soon as the pressure exceeds six atmospheres—namely, the pressure exerted by the valve's spring—and a portion of the liquid will consequently be forced out through 19 until by the consequent expansion of the charge in the enlarged capacity of $2^x$ the pressure has sunk to six atmospheres, when valve 19 will close, so that the final compression of the charge can never exceed six atmospheres. The gas-supply cock is then opened and the circuit of the igniter 13 is closed, whereupon the motor will run with a maximum filling until the normal speed has been attained. If the load on the motor is less than the maximum allowable load, the disk-regulator 25 will cause the cam 24, which revolves, together with cam 23, to shift round more or less relatively to the latter in such manner as to extend the action of the combined cams, so as to keep the inlet-valve 4 open during a portion of the compression-stroke, and thereby causing a portion of the combustible charge previously drawn in to be forced into the chamber 10. At the beginning of the next suction-stroke this quantity will first pass back into the motor-cylinder before the gas and air supply valves open by suction, and consequently a less quantity of combustible charge will enter from the supply-channels. The compression-space in $2^x$ will now be too large in proportion to the volume of the charge in the cylinder, so that the compression of the latter will not reach six atmospheres, and valve 19 will consequently not be forced open, so that the chamber $2^x$ will become filled to a greater extent with liquid until its capacity has become so much reduced that the normal compression-pressure is reached or exceeded. If the load increases so that more combustible mixture is retained in the cylinder than during the compression-stroke, the excess of water in $2^x$ will again be driven out through valve 19, thus preventing the compression from rising above six atmospheres. As the expansion of the gases on the ignition of the charge will always take place throughout the entire volume of the working stroke, the gases will expand down to atmospheric pressure when working with a charge reduced to a certain extent, and this increased expansion will result in a considerably greater utilization of the heat generated. Thus assuming that the motor has a stroke volume of three liters and makes three hundred revolutions, and that for each cycle of two revolutions a quantity of liquid equal to two per cent. of the stroke volume were drawn in, and, lastly, that the maximum compression-space amounts to one-sixth of the total volume, the following will result: total cylinder volume, 3.6 liters; compression volume, .6 liter; stroke volume, three liters; amount of liquid drawn in, $3 \times 0.02 = 0.06$ liter, so that with twenty revolutions the whole of the compression-space could be filled with water without wasting power. As the motor cannot run with a zero-filling, fifteen revolutions will suffice or three seconds' duration. Therefore even with a very rapid succession of variations in the load the work will be performed with practically the same degree of compression. Experiments have shown that it is sufficient to supply water to the extent of 0.5 per cent. of the stroke volume. The water will in that case leave the motor at about the normal temperature of the cooling-water.

With the above-described construction of motor the compression can be taken somewhat higher than usual, as the end pressure will not depend upon the degree to which the motor-cylinder is heated.

If the combustible charge be cooled during the compression period by the introduction of water spray either into chamber 12 or into the cylinder, the efficiency can be still further increased.

Fig. 8 shows a diagrammatic section of the above-described construction, the several parts being indicated by the same numerals as above. Fig. 9 shows a modification in which the combustion-gases are prevented from coming in contact with the liquid, the arrangement shown being, for example, a vertical one; but it may be applied to any other form of motor. The piston is shown in its highest position. The cover 27 is formed with a cylindrical space with a piston 28, shown in its lowest position, it being prevented by a stop 29 from sinking lower. The space 30 between piston 28 and cover 27 is filled with liquid and communicates with the valve-chamber 31. The piston 28 will assume a higher or lower position, according to the volume of the combustible charge in the cylinder, thus forming a compression-space of the correct size. The action of the valve apparatus is the same as described in the first construction. Instead of having a separate piston in the cover the engine-piston may be made expansible and be connected with the valve-chamber 31 by means of an articulated tubular connection or a tube working in a stuffing-box similar to arrangements employed for cooling the pistons of motors. The valve-chamber 31 can in that case be arranged at any convenient part of the base of the motor or it may be separate therefrom. With this arrangement an automatic cooling of the piston is also obtained.

Although I have always spoken of gas as the combustible for the above-described motor, it will be evident that sprayed or vaporized liquid fuel may also be employed.

It will be evident that the herein-described construction and method of operating can also be applied to a double-acting motor. In this case a compression-chamber, such as $2^x$, would be applied to each end of the cylinder; but both of these can be connected to one and the same valve apparatus, such as that described with reference to Figs. 1 to 6, for the admission of liquid into the compression-chambers. Also a single mixing-valve, such as 6 7 8, and expansible receiver, such as 10, may be used in combination with the two inlet-valves 4 of the cylinder.

The liquid for supplying the compression-chamber of the motor-cylinder may either be contained in an elevated reservoir or in an air vessel under suitable pressure, into which it is forced by the compression-pressure and from which it passes back into the valve-chamber. If the liquid employed is water, the said reservoir may also be used for the cooling-water of the engine, in which case the water would be forced through the water-jacket, &c., of the motor by the compression-pressure, passing thence into the reservoir, from which it would pass back into the valve-chamber and compression-chamber, as shown at Fig. 8, where the water passes from the air vessel 42 through pipe $16^\times$ to the compression-chamber $2^\times$, thence through pipe $19^\times$ to the water-jacket 45, and thence back into 41 through pipe 46.

If the liquid employed for the compression-chamber is not water, but oil, for example, a separate reservoir would of course be required for the cooling-water.

Having thus described the nature of this invention and the best means I know of carrying the same into practical effect, I claim—

1. In an internal-combustion motor of the kind herein referred to, the combination with the working cylinder of a space containing the compressed combustible charges and means for varying the capacity of said space in proportion to the varying volume of the charges by the introduction of liquid into it, substantially as described.

2. In an internal-combustion motor of the kind herein referred to, the combination with the working cylinder of a space for containing the compressed combustible charge, a supply of liquid to such space, and means for allowing the discharge of liquid from such space so as to increase its capacity when the pressure of the compressed charge exceeds a predetermined limit, substantially as described.

3. In an internal-combustion motor of the kind herein referred to, the combination with the compression-space of the working cylinder of a supply of liquid to said space, a piston in said space interposed between the liquid and the combustible charge and means for allowing the discharge of liquid from said space when the pressure of the compressed charge exceeds a certain limit, substantially as described.

4. In an internal-combustion motor of the kind herein referred to, the combination with the compression-space of the working cylinder of means for supplying liquid to said space, and a discharge-valve communicating with said space loaded so as to open and allow of the discharge of liquid therefrom when the pressure of the compressed charge exceeds the load on the valve, substantially as and for the purpose described.

5. In an internal-combustion motor of the kind herein referred to, the combination with the compression-space of the working cylinder of an adjustable inlet-valve for admitting a regulated supply of liquid to said space, a discharge-valve communicating with said space, loaded so as to open and allow of the discharge of liquid therefrom when the pressure of the compressed charge exceeds the load on the valve, a shut-off valve interposed between the compression-space and the loaded valve, and means for opening said shut-off valve during the compression-stroke of the working piston and for keeping it closed at all other times, substantially as and for the purposes set forth.

6. In an internal-combustion motor of the kind herein referred to, the combination with the motor-cylinder of a chamber constituting the compression-space for the combustible charges, the capacity of such chamber being varied by the admission of liquid thereto or discharge of liquid therefrom so as to be proportionate to the varying loads of the motor, substantially as and for the purpose set forth.

7. In an internal-combustion motor of the kind herein referred to, the combination with the motor-cylinder of a compression-space the capacity of which can be varied in proportion to variations in the load of the motor, means for supplying liquid to such compression-space during the suction-stroke of the motor for varying its capacity, means for allowing a certain portion of such liquid to escape from said space when the compression of the combustion-charge therein exceeds a certain limit, and means for preventing such escape after the completion of the compression-stroke, substantially as and for the purpose set forth.

8. In an internal-combustion motor, the combination with the motor-cylinder of a chamber constituting the compression-space for the combustible charges, a valve-chamber with a check-valve connecting the said compression-chamber with a supply of liquid, a valve communicating with said valve-chamber loaded to withstand any desired pressure and connecting said chamber with a discharge for such liquid, and a valve to close the communication between the valve-chamber and the said loaded valve except during the compression-period, substantially as and for the purposes set forth.

9. In an internal-combustion motor of the kind herein referred to, the combination with the working cylinder, of a space containing the compressed combustible charges, means to vary the capacity of said space in proportion to the varying volume of the charge by the introduction of liquid into it, and a loaded valve through which a portion of such liquid is expelled during the compression-stroke, substantially as described.

10. In an internal-combustion motor, the combination with the working cylinder, of means to supply combustible thereto, means to supply practically a constant quantity of liquid at each suction-stroke of the piston to said cylinder and means to vent liquid from the chamber at each compression-stroke, the quantity of liquid vented from the cylinder being dependent upon the quantity of charge compressed, substantially as described.

11. In an internal-combustion motor of the kind herein referred to, the combination with the motor-cylinder of a chamber constituting the compression-space, a piston fitting such chamber, means for supplying liquid behind said piston so as to move it for varying the compression-space of the chamber, and means for allowing a portion of the liquid behind said piston to be forced out by the latter when the pressure in the compression-space exceeds a predetermined limit, substantially as described.

12. In an internal-combustion motor such as herein referred to, a chamber such as $2^x$ constituting the compression-chamber of the cylinder, a valve-chamber such as 15 in communication on the one hand with chamber $2^x$, and on the other hand with a supply of liquid, a check-valve such as 17 controlling the supply of liquid to the valve-chamber and compression-chamber, an outlet for liquid communicating with the valve-chamber through a loaded valve such as 19 adapted to allow the escape of liquid from the compression-chamber $2^x$ when the pressure therein exceeds a predetermined limit and a valve such as 18 actuated by the motor valve-gear so as only to open the communication between the compression-chamber $2^x$ and the loaded escape-valve 19 during the compression-stroke, substantially as and for the purpose set forth.

13. In an internal-combustion motor such as herein referred to, the combination with the motor-cylinder, of a compression-chamber whose capacity is rendered variable by the introduction of liquid therein, a valve-chamber containing an inlet-valve for combustible mixture and means adapted to hold said inlet-valve open during part of the compression-stroke, as well as during the suction-stroke when the load on the motor is reduced below the normal, substantially as and for the purposes described.

14. In an internal-combustion motor such as herein referred to, the combination with the motor-cylinder of a compression-chamber whose capacity is rendered variable by the introduction of liquid therein, a valve-chamber containing an inlet-valve for combustible mixture and a double cam device such as 23, 24, actuating the inlet-valve and adapted to hold it open during part of the compression-stroke as well as during the suction-stroke, when the load on the motor is reduced below the normal, substantially as described.

15. In an internal-combustion motor such as herein referred to, the combination with the motor-cylinder of a compression-chamber whose capacity is rendered variable by the introduction of liquid therein, a valve-chamber containing an inlet-valve for combustible mixture and a discharge-valve for the products of combustion, an expansible chamber communicating with said valve-chamber, and a cam device actuating the inlet-valve which cam device has a movable part that is shifted by a governor when the load on the engine is reduced below the normal, in order to hold the inlet-valve open during part of the compression-stroke as well as during the suction-stroke, substantially as and for the purposes described.

16. In an internal-combustion motor of the kind herein referred to, the combination with the motor-cylinder of a compression-chamber such as $2^x$, whose capacity is rendered variable by the introduction of liquid therein, a valve-chamber such as 12 containing an inlet-valve such as 4 for combustible mixture and a device in such valve-chamber for introducing water-spray therein for cooling the combustible mixture during compression, substantially as described.

17. In a double-acting internal-combustion motor of the kind herein referred to, the combination with each end of the motor-cylinder of a compression-chamber, and a single-valve apparatus communicating with both compression-chambers for the introduction of liquid therein which valve apparatus comprises a check-valve for controlling the admission of liquid to the valve-chamber and to the compression-chambers, a loaded valve for allowing the escape of such liquid from the valve-chamber and compression-chambers when the pressure therein exceeds a definite amount, and a valve actuated by the motor valve-gear for controlling the communication between the valve-chamber and compression-chambers, and the said loaded valve, substantially as and for the purposes described.

18. In a double-acting internal-combustion motor of the kind herein referred to, the combination with the motor-cylinder of a compression-chamber at each end thereof whose capacity is capable of being varied, means to control the admission of liquid thereto, an inlet-valve for combustible mixture at each end of the cylinder adapted to be kept open by a governor during part of the compression-stroke when the load on the motor is reduced, a single gas and air mixing valve communicating with both the said inlet-valves, and an expansible chamber communicating with the mixing and inlet valves, serving to receive a portion of the combustible charges admitted to the cylinder when the said inlet-valve is kept open during part of the compression-stroke, substantially as and for the purpose set forth.

19. In an internal-combustion motor of the kind herein referred to, the combination with the motor-cylinder of a compression-chamber communicating with a valve apparatus, whereby a quantity of liquid can be admitted to the compression-chamber for varying its capacity, a loaded valve in such apparatus adapted to allow liquid to escape therefrom when a predetermined pressure in the said pressure-chamber is exceeded, a valve actuated by the valve-gear of the motor for controlling the communication of said loaded valve with the valve apparatus and compression-chamber, and means for supplying the valve apparatus with liquid under a head of pressure, substantially as and for the purposes set forth.

20. In an internal-combustion motor of the kind herein referred to, the combination with the motor-cylinder of a compression-chamber communicating with a valve apparatus adapted to admit a quantity of liquid to the compression-chamber for varying its capacity and a reservoir containing liquid under a head of pressure serving both for supplying the said valve apparatus with water and for supplying the cooling-water to the motor, substantially as described.

21. In an internal-combustion motor of the kind herein referred to, the combination with the motor-cylinder of a compression-chamber communicating with a valve apparatus adapted to admit a quantity of liquid to the compression-chamber for varying its capacity, a reservoir containing cool water under a head of pressure and means for causing the said water to circulate from the reservoir through the said valve apparatus and through those parts of the motor that require to be cooled and finally to pass back to the reservoir, substantially as described.

22. In an internal-combustion motor such as herein referred to, the combination with the motor-cylinder of a compression-chamber whose capacity is rendered variable by the introduction of liquid therein, a valve-chamber containing an inlet-valve for combustible mixture, adapted to be held open during part of the compression-stroke as well as during the suction-stroke, and an expansible reservoir communicating with said inlet-valve chamber and adapted to receive that portion of the combustible charge which is expelled from the motor-cylinder through the open inlet-valve during part of the compression-stroke, substantially as described.

In testimony whereof I have hereunto set my hand in presence of two subscribing witnesses.

ADOLF VOGT.

Witnesses:
 GERALD L. SMITH,
 EDWARD GARDNER.